US008322863B1

(12) United States Patent
Cho et al.

(10) Patent No.: US 8,322,863 B1
(45) Date of Patent: Dec. 4, 2012

(54) APPARATUS AND METHOD FOR AUTOMATED VISUAL DISTORTION ADJUSTMENTS FOR A PORTABLE PROJECTION DEVICE

(76) Inventors: Samuel Seungmin Cho, Fremont, CA (US); Christine Hana Kim, San Jose, CA (US)

( * ) Notice: Subject to any disclaimer, the term of this patent is extended or adjusted under 35 U.S.C. 154(b) by 295 days.

(21) Appl. No.: 12/819,172

(22) Filed: Jun. 18, 2010

(51) Int. Cl.
*G03B 21/00* (2006.01)

(52) U.S. Cl. .......................................... 353/70
(58) Field of Classification Search ............ 353/69, 353/70, 121; 352/140, 105–120; 359/676, 359/677; 382/295, 275; 348/745
See application file for complete search history.

(56) References Cited

U.S. PATENT DOCUMENTS

| | | | |
|---|---|---|---|
| 2005/0052620 A1* | 3/2005 | Tamura | 353/69 |
| 2006/0103811 A1* | 5/2006 | May et al. | 353/69 |
| 2006/0285080 A1* | 12/2006 | Kurihara | 353/70 |
| 2008/0079907 A1* | 4/2008 | Takatsu et al. | 353/70 |
| 2009/0079945 A1* | 3/2009 | Klosowiak et al. | 353/69 |
| 2010/0060803 A1 | 3/2010 | Slack et al. | |
| 2010/0061659 A1 | 3/2010 | Slack et al. | |

* cited by examiner

*Primary Examiner* — Thanh Luu
*Assistant Examiner* — Renee Naphas
(74) *Attorney, Agent, or Firm* — Invent Capture, LLC; Samuel S. Cho

(57) ABSTRACT

An apparatus and a method are disclosed for automated projection image adjustments for a portable projection device. In one embodiment of the invention, the apparatus periodically polls a tilt sensor inside the portable projection device and uses the tilt sensor reading as a key to a lookup table which stores pre-computed visual distortion adjustment values. Furthermore, the apparatus can also poll a distance measurement sensor to measure a distance between a projector lens and a presumed projection surface periodically. The measured distance value can also be used as an additional parameter to the key for the lookup table to retrieve appropriate visual distortion adjustment values which are pre-computed and stored in the lookup table. The fast pre-computed adjustment value retrieval without real-time computation of graphical transformations to correct the visual distortions minimizes processor load, energy consumption, and processing delays for projection image corrections.

19 Claims, 8 Drawing Sheets

200

| Tilt Sensor Reading (V) | | Distance (m) | 0.5 ~ 1.0 | 1.0 ~ 1.5 | 1.5 ~ 2.0 | 2.0 ~ 2.5 | 2.5 ~ 3.0 |
|---|---|---|---|---|---|---|---|
| Xout | Yout | Zout | | | | | |
| 1.05 | 1.13 | 0.97 | Tilt Adjust: 25<br>Keystone Adjust: 2<br>Focal Adjust: 0.5~1.0 | Tilt Adjust: 25<br>Keystone Adjust: 2.2<br>Focal Adjust: 1.0~1.5 | Tilt Adjust: 25<br>Keystone Adjust: 2.4<br>Focal Adjust: 1.5~2.0 | Tilt Adjust: 25<br>Keystone Adjust: 2.6<br>Focal Adjust: 2.0~2.5 | Tilt Adjust: 25<br>Keystone Adjust: 2.8<br>Focal Adjust: 2.5~3.0 |
| 1.11 | 1.18 | 1.09 | Tilt Adjust: 40<br>Keystone Adjust: 1.6<br>Focal Adjust: 0.5~1.0 | Tilt Adjust: 40<br>Keystone Adjust: 2<br>Focal Adjust: 1.0~1.5 | Tilt Adjust: 40<br>Keystone Adjust: 2.4<br>Focal Adjust: 1.5~2.0 | Tilt Adjust: 40<br>Keystone Adjust: 2.8<br>Focal Adjust: 2.0~2.5 | Tilt Adjust: 40<br>Keystone Adjust: 3.2<br>Focal Adjust: 2.5~3.0 |
| 1.16 | 1.23 | 1.15 | Tilt Adjust: 60<br>Keystone Adjust: 0<br>Focal Adjust: 0.5~1.0 | Tilt Adjust: 60<br>Keystone Adjust: 0<br>Focal Adjust: 1.0~1.5 | Tilt Adjust: 60<br>Keystone Adjust: 0<br>Focal Adjust: 1.5~2.0 | Tilt Adjust: 60<br>Keystone Adjust: 0<br>Focal Adjust: 2.0~2.5 | Tilt Adjust: 60<br>Keystone Adjust: 0<br>Focal Adjust: 2.5~3.0 |

An Embodiment of an LUT-based Method and Configuration for Auto Tilt-Leveling, Auto Keystone-Balancing, and optional Auto Focal Adjustment in the Present Invention

APPARATUS AND METHOD FOR AUTOMATED VISUAL DISTORTION ADJUSTMENTS FOR A PORTABLE PROJECTION DEVICE

BACKGROUND OF THE INVENTION

The present invention generally relates to a portable projection device. More specifically, the present invention relates to an apparatus and a method for automated visual distortion adjustments for a portable projection device.

Graphics and video projectors have become popular and cost effective for mass consumer markets in recent years. Once bulky and expensive in the past, projection devices are increasingly becoming miniaturized and less expensive. For example, a standalone projector in the consumer market today is gradually getting lighter, cheaper, and smaller due to projection technology advancements such as miniaturized Digital Light Processing (DLP) technologies. Furthermore, some projection devices are becoming sufficiently miniaturized to be integrated into mobile devices such as cellular phones, laptops, and dedicated portable gaming devices.

Although integration of miniature projection devices into mobile devices are still early in industry adoption cycles, the advantages of projecting graphics on a blank wall or a projection screen from a mobile device may be numerous. For example, a gamer who was previously constrained by a size of a display unit attached to a dedicated portable gaming device or a cellular phone for viewing game-related graphics may find a "blown-up," large-screen projection of gaming graphics from the dedicated portable gaming device very appealing. The blown-up, large-screen projection capability from a mobile device may even replace a need for a standalone game console device in the future, as the portability of a mobile gaming device and the flexibility of large-screen projection are merged into one lightweight device. Furthermore, the integration of a projection device into a mobile device may empower a user to utilize a large-screen projection in business presentations, conferences, and work-related software applications without being visually limited by a small screen size on a typical mobile device.

In both standalone projector devices and mobile devices with integrated projection capabilities, visual distortions introduced by non-ideal angles between a projecting medium (e.g. a projector lens) and a projected surface (e.g. a blank wall or a projection screen) can cause user inconveniences. For example, a projector lens tilted upward relative to a flat horizontal surface when a projected surface is vertical to the flat horizontal surface introduces a "keystone" visual distortion, with an upper portion of a projected image wider than a lower portion of the projected image. Similarly, if the projector lens is tilted to the right (e.g. clockwise) relative to its non-rotational angle (e.g. in case a surface below the projector lens is tilted, or in case the projector device is held by hand with a slight rotational twist), the projected image also appears "rotated" clockwise or twisted to the right.

There have been some attempts to provide some level of automated adjustments to visual distortions from a projector. U.S. patent application Ser. No. 12/206,554 titled "Method and Apparatus for Depth Sensing Keystoning" by Brandon Dean Slack et al. discloses a method for sensing depth differences of two points on a projected surface, which involves real-time calculations for a multiple-stage graphical transformations of an original image based on a camera image capture or distance-measurement sensor usage. After the multiple-stage graphical transformations involving real-time calculations for transformations, a "corrected" image with adjusted keystone effects can be projected to a screen. Similar to other existing image capture-based adjustment methods, Brandon Dean Slack et al's Ser. No. 12/206,554 requires a heavy amount of computations to derive real-time graphical transformations based on sensor readings. The computational load on a graphics processor or a microprocessor can be especially heavy, if some of the sensors used require an image capture by a camera and image interpretations for graphical transformation calculations (as in FIG. 3A and FIG. 4 of Brandon Dean Slack et al.'s patent application Ser. No. 12/206,554). Heavy computational loads can result in significant processing delay, often at least several seconds from initial detection to automatic adjustments, for each image adjustment.

Another US Patent Application by Brandon Dean Slack, U.S. Ser. No. 12/206,546, discloses a projection system which can be calibrated based on camera image capture and/or an "auxiliary" device, wherein the auxiliary device provides its own perspective or its point of view to the projected image. As stated in Paragraph [0046] of U.S. Ser. No. 12/206,546, the "auxiliary" device is described to be a separate unit from a projection system or a presentation system to provide a camera image capture of a projected screen or other sensory measurements. U.S. Ser. No. 12/206,546 describes the auxiliary device as a sensor device or a client device located somewhere distant from the projection system unit, wherein a main purpose of the auxiliary device is to provide a visual perspective and sensory feedback from the point of view at the location of the auxiliary device to the projection system located somewhere else (i.e. FIG. 8 and Paragraph [0089] in U.S. Ser. No. 12/206,546).

In practical implementations, each step of manipulating images such as image capture, captured image processing, captured image interpretations with other images, and real-time graphic transformation calculations, as disclosed in prior publications such as U.S. Ser. No. 12/206,554 and U.S. Ser. No. 12/206,546, adds a significant amount of time delay before a corrected image can be projected to a projected screen. These conventional image adjustment procedures for projection systems can easily take five to ten seconds, if not longer, before projecting the corrected image. Any multi-second delays are unacceptable if projection image adjustments need to be made continuously in every fraction of a second at a high refresh rate. For example, if an projection image adjustment requires fast refresh rates (e.g. 10~20 Hz, or 10~20 times per second for visual distortion adjustment between a projector and a projection screen), the conventional automated projected image adjustment methods such as the ones disclosed in U.S. Ser. No. 12/206,554 and U.S. Ser. No. 12/206,546 are grossly unsuitable due to a heavy processor calculation load and image capture, process, and interpretation workload.

The two prior publications (U.S. Ser. No. 12/206,554, U.S. Ser. No. 12/206,546) by Brandon Dean Slack et al. may be useful for a standalone projector system on a fixed location or a stationary surface, which allows a projection system designer to assume that a calibration or an adjustment of a projector system is typically a one-time event at the beginning of each projector use. However, these methods disclosed by Brandon Dean Slack et al. do not anticipate, suggest, or teach a method or an apparatus to enable a very rapid adjustment, or a very rapid preemptive adjustment for image projection when a projector itself is placed on a non-stationary surface, such as a user's hand which may tilt, vacillate, or move abruptly and frequently.

Because most projection devices are still envisioned and designed to be placed on a stationary flat surface, fast-refresh, real-time, and/or automated adjustments schemes to counteract tilts, rotations, keystones, or other visual distortions caused by an unstable surface (e.g. a projector on a surface of a user's hand) for a projection device are not yet available today. Most mobile devices operate for extended periods on batteries and use microprocessors and graphic chipsets with calculation capabilities typically less than those used in conventional desktop computers. Therefore, for mobile devices which integrate miniaturized projectors, or for highly-portable miniaturized projectors, a novel method and a novel apparatus for rapid visual distortion adjustments which consume low power and exhibit low microprocessor calculation loads may be highly beneficial.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an apparatus for automated visual distortion adjustments for a portable projection device is disclosed. This apparatus comprises a tilt sensor embedded in the portable projection device, wherein the tilt sensor is designed to determine a current position, a current acceleration, or a current directional orientation of the portable projection device relative to a horizontal plane or a vertical plane; a distance measurement sensor located near a projector lens embedded in the portable projection device, wherein the distance measurement sensor is designed to determine a current distance between a surface near the projector lens and a presumed projection surface; and a lookup table (LUT) unit operatively connected to the tilt sensor and the distance measurement sensor, wherein the LUT unit is designed to use sensor output values from the tilt sensor and the distance measurement sensor as a lookup table key to retrieve one or more pre-computed visual distortion adjustment values stored in the LUT unit.

Furthermore, in another embodiment of the invention, a method for automatically adjusting a visual distortion from a portable projection device is also disclosed. This method comprises the steps of: reading one or more current values from a tilt sensor to determine a magnitude of tilt, keystone distortion, or other factors for a potential visual distortion for a projector lens relative to one or more geometrical axis which define a horizontal plane or a vertical plane; reading a distance sensor for a distance measurement between a surface near the projection lens and a projected surface, wherein the projected surface is on the vertical plane typically represented by a projection screen or a wall; using the one or more current values from the tilt sensor and the distance measurement as a lookup table key to retrieve a corresponding pre-computed visual distortion adjustment value from a lookup table (LUT), wherein the pre-computed visual distortion adjustment value contains information to correct an undesirable tilt, a keystone distortion, or other visual distortions caused by a non-ideal or an offset angle of the projector lens relative to the projected surface; and instructing a graphics processor or a central processing unit (CPU) of the portable projection device to correct the undesirable tilt, the keystone distortion, or other visual distortions by adjusting a raw projection image with the pre-computed visual distortion adjustment value to produce a corrected projection image.

Yet in another embodiment of the invention, an apparatus for automated visual distortion adjustments for a mobile device integrating a miniaturized projector is also disclosed. This apparatus comprises a tilt sensor embedded in the mobile device, wherein the tilt sensor is designed to determine a current position, a current acceleration, or a current directional orientation of the mobile device relative to a horizontal plane or a vertical plane; a distance measurement sensor located near a projector lens of the miniaturized projector embedded in the mobile device, wherein the distance measurement sensor is designed to determine a current distance between a surface near the projector lens and a presumed projection surface; and a lookup table (LUT) unit operatively connected to the tilt sensor and the distance measurement sensor, wherein the LUT unit is designed to use sensor output values from the tilt sensor and the distance measurement sensor as a lookup table key to retrieve one or more pre-computed visual distortion adjustment values stored in the LUT unit.

BRIEF DESCRIPTION OF DRAWINGS

FIG. 7 shows an example of a lookup table (LUT) configuration for auto sideways tilt-leveling, keystone-balancing, and optional auto focal adjustments in accordance with an embodiment of the invention.

DETAILED DESCRIPTION

Figure 1:
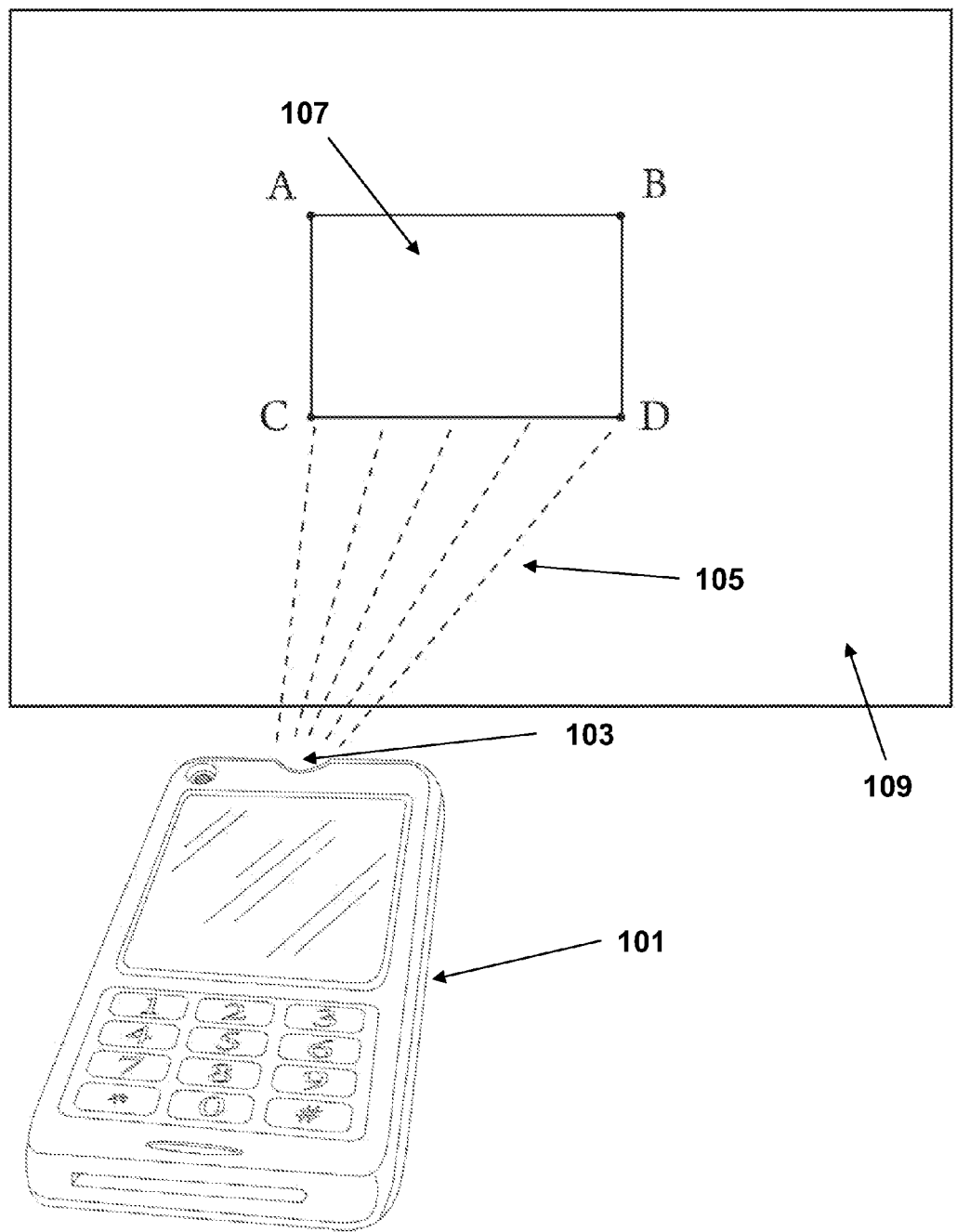
FIG. 1 shows a perspective top surface view of a mobile device with an integrated projector and a projected image on a projection screen without any visual distortions due to an ideal positioning of the mobile device.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more apparatuses and methods for automated visual distortion adjustments for a portable projection device, wherein the portable projection device may be a standalone projection device or an integrated projection unit into a mobile device. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order and do not imply any limitations in the invention.

One objective of an embodiment of the invention is to provide an automated visual distortion adjustment apparatus and a related method, which can preemptively or dynamically detect undesirable tilt, keystone, focal, or other distortions on a projected image and correct visual distortions rapidly by retrieving pre-computed adjustment values stored in a lookup table.

Furthermore, another objective of an embodiment of the invention is to provide a method and an apparatus to minimize processor (e.g. microprocessor, graphics processor, CPU, and etc.) load, power consumption, and processing delay during an automated projection image adjustment procedure.

Yet, another objective of an embodiment of the invention is to provide a method and an apparatus to enable a fast refresh rate for periodic and automated projection image adjustment procedures, wherein a processing time for each automated projection image adjustment procedure takes only a fraction of a second and wherein the fast refresh rate can be sufficiently high (e.g. 20 Hz, or 20 checks and adjustment cycles for a projection image per second) to minimize visual delay effects between an intended graphical representation by an electronic device and a projected image.

Moreover, another objective of an embodiment of the invention is to provide an option of preemptively correcting an expected projection image distortion by taking sensor readings and retrieving pre-computed display adjustment values stored in a lookup table. For example, by taking tilt sensor or gyroscopic readings and measuring distance between a projection lens to a presumed projection surface (e.g. a vertical wall, a vertical projection screen, or any other surface to which a projected image from a projector lens is likely to form) in each rapid refresh cycle (e.g. 20 times a second, or 20 Hz), the visual distortion adjustment apparatus integrated in a portable projection device can anticipate a likely visual distortion before a distorted image is projected, and then preemptively correct and project an adjusted image to the presumed projection surface.

For the purpose of describing the invention, a term "miniaturized projector" or "portable projection device" is defined as an easy-to-carry projection device which may even be integrated into a casing of a mobile device. One example of integration is an embedded miniaturized projector with an integrated projector lens exposed from the casing of the mobile device. Another example of integration is a retractable and/or detachable miniaturized projector which has a projector body configured to extend from, retract to, or dock with a casing of a mobile device.

In addition, for the purpose of describing the invention, a term "mobile device" is defined as a cellular phone, a handheld game device, a portable computer, or any other electronic device which is lightweight enough to be carried around by a single user.

Moreover, for the purpose of describing the invention, a term "tilt sensor" is defined as a sensing device which can determine a current amount of tilt, a directional orientation, directional acceleration, or other position-related parameters. Examples of "tilt sensors" include, but are not limited to, a gyroscopic sensor, an accelerometer, a position sensor, and an optical leveling sensor. Tilt sensors may be MEMS (micro electro-mechanical systems) devices, mechanical devices, and/or electromagnetic devices.

Furthermore, for the purpose of describing the invention, a term "projector lens" is defined as an optical lens configured to project a desired image on a wall or a projection screen, wherein the projector lens is typically exposed from a casing of a portable projection device, or wherein the projector lens is part of a projector body configured to extend from, retract to, or dock with a casing of the portable projection device.

In addition, for the purpose of describing the invention, a term "keystone adjustment" is defined as a projection image adjustment which changes a top-to-bottom perception (i.e. vertical "keystoning") or a left-to-right or right-to-left depth perception (i.e. horizontal "keystoning"). An ideally-adjusted keystone typically results in a rectangular-shape projection borderline, whereas imperfect keystone exhibits trapezoidal shapes or other non-rectangular borderlines for a projected image.

FIG. 1 shows a perspective top surface view (100) of a mobile device (101) with an integrated miniaturized projector (103). In general, the mobile device (101) with the integrated miniaturized projector (103) is a type of a portable projection device, which can be portably carried by a user to project an image on a desired surface. In FIG. 1, the integrated miniaturized projector (103) emits projection rays (105) from a projector lens (e.g. 505 of FIG. 5) to form a projected image (107) on a projected surface (109) without any tilt or keystone-related distortions due to an ideal positioning of the mobile device. Typically, the projected surface (109) is a vertical wall or a vertical projection screen. In a preferred embodiment of the invention, an ideal orientation of the projected image (107) without any undesirable tilts has a horizontal borderline (e.g. AB, CD) and/or a vertical borderline (e.g. AC, BD). Furthermore, in the preferred embodiment of the invention, a projected image with no keystone-related distortions exhibit a parallel horizontal borderlines (e.g. AB and CD are parallel) and/or a parallel vertical borderlines (e.g. AC and BD are parallel). Points A, B, C, D for the projected image (107) in FIG. 1 represent rectangular borderlines (i.e. AB, BD, CD, AC) with the horizontal borderlines (i.e. AB, CD) and the vertical borderlines (i.e. AC, BD), which indicate that the projected image is correctly-oriented without tilt or keystone-related distortions.

Typically, the correctly-oriented projected image without tilt or keystone-related distortions is possible if a portable projection device (e.g. the mobile device (101) with the integrated miniaturized projector (103) is at an "ideal position" relative to the projected surface (109). In general, the ideal position of the integrated miniaturized projector (103) occurs, if a surface exposing a projector lens is kept parallel to the projected surface (109) (i.e. removes horizontal keystone distortions) and if the surface exposing the projector lens is also kept perpendicular to the ground (i.e. removes vertical keystone distortions, assuming that the projected surface (109) is a vertical surface). Furthermore, if the portable projection device is located on a flat, horizontal surface and if the projected surface (109) a vertical screen or a vertical wall, the projected image (107) is correctly oriented without any undesirable rotational tilts.

In these ideal angles of projection between the portable projection device (e.g. 101) and the projected surface (109), rotational tilts or keystone distortions on a projected image are nearly nonexistent. Unfortunately, portable projection devices may encounter situations in which forming these ideal angles and positions are difficult (e.g. 207 in FIG. 2 which has an undesirable rotational tilt, EFGH in 407 of FIG. 4 which has a vertical keystone distortion, and etc.), even after manual adjustments of angles and locations by a user moving or changing positions of the portable projection device and/or the projected surface. The difficulty of forming consistently ideal angles and positions between a projector lens and a projected surface is especially pronounced for an integrated miniaturized projector (e.g. 103) in a mobile device (e.g. 101) which may be held by a user's hand. A small amount of hand twist or vibration can result in a noticeable amount of undesirable rotational tilts or keystone distortions, which are relatively new challenges for portable projection devices.

Many existing portable projection devices today incorporate an algorithmic technique commonly known as "digital keystone correction". By using a digital image adjustment algorithm, the digital keystone correction schemes can adjust a raw projection image by allowing a user to enter a keystone adjustment value into a menu on the portable projection device, until the user is satisfied with a keystone-corrected image on the projected surface. The conventional digital keystone correction generally involves a user performing trial-and-error visual adjustments of a projected image by using a user interface provided by the portable projection device. This user-initiated manual trial-and-error visual adjustments may be sufficient for a portable projection device on a stationary and flat surface because one initial adjustment procedure may be good enough for a particular image projection event because the stationary and flat surface generally does not tilt or move. Most existing portable projection devices are currently still envisioned to be typically placed on a stationary and flat surface, such as a top of a desk or a table.

However, as projection devices get increasingly miniaturized and integrated into mobile devices, holding a miniaturized projector in a user's hand may become a common practice. Because a user's hand is not as stationary as a desk or a table, a projected image (e.g. 107) from a miniaturized projector (e.g. 103) may be subject to frequent shakes, tilts, and keystone distortions caused by the user's hand, which could present a significant inconvenience to the user and other viewers. As shown and described for FIGS. 2~8 in the detailed description of the invention, the automated visual distortion adjustment apparatus and method for the present invention are designed to reduce or remove this significant user inconvenience.

Figure 2:
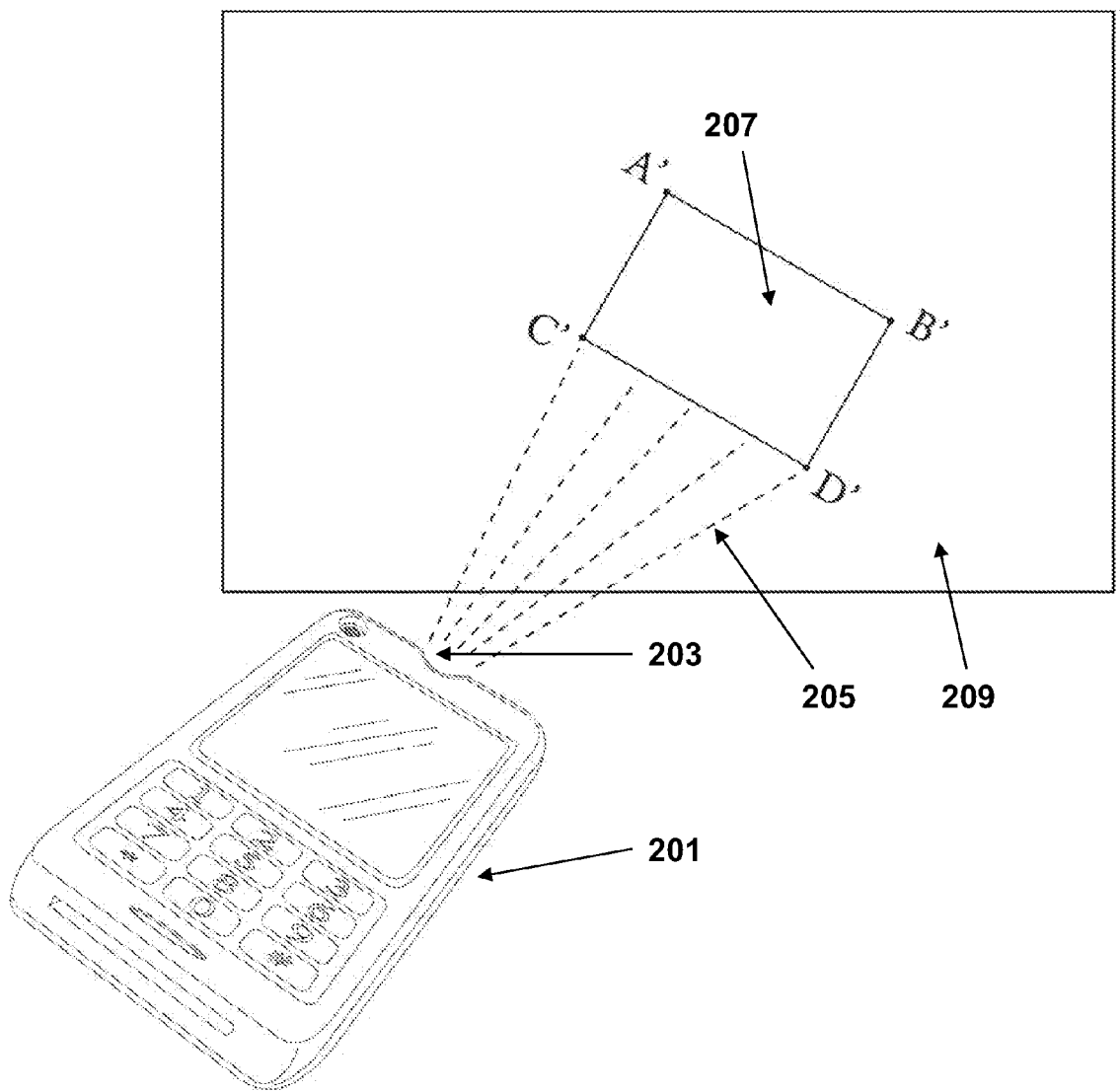
FIG. 2 shows a mobile device tilted clockwise relative to a flat horizontal surface, and a raw unadjusted projected image A'B'C'D' with a corresponding rotational tilt on a projected surface, when an automated visual distortion adjustment is not used in accordance with an embodiment of the invention.

FIG. 2 shows a top perspective view (200) of a mobile device (201) tilted clockwise relative to a flat horizontal surface, and a raw unadjusted image A'B'C'D' (207) with a corresponding rotational tilt on a projected surface (209), when an automated visual distortion adjustment is not used in accordance with an embodiment of the invention. In general, the mobile device (201) with the integrated miniaturized projector (203) is a type of a portable projection device, which can be portably carried by a user to project an image on a desired surface. In FIG. 2, the integrated miniaturized projector (203) emits projection rays (205) from a projector lens (e.g. 505 of FIG. 5) to form the raw projected image (207) on the projected surface (209), wherein the raw projection image (207) exhibits a clockwise tilt corresponding to a tilted orientation of the mobile device (201). Typically, the projected surface (209) is a vertical wall or a vertical projection screen.

In a preferred embodiment of the invention, the mobile device (201) is held by a user's hand which causes the tilted orientation of the mobile device (201) relative to the flat horizontal surface in this particular example. In some uses of the mobile device (201), the user's hand may twist or tilt back and forth, causing a corresponding "rocking" tilt movements on the integrated miniaturized projector (203) during an image projection mode to the projected surface (209). If an image to be projected does not undergo any visual distortion adjustments prior to projection to the projected surface (209), the raw projected image (207) will directly reflect most or all of the tilting movements exerted on the mobile device (201) by the user's hand. In most cases, rotationally-tilted projected images due to an unstable surface (e.g. a user's hand) supporting a miniaturized projector (e.g. 203) are very undesirable to the user and/or other viewers. Such rotationally-tilted images may be especially undesirable and annoying, if a user's multiple button presses to a device (e.g. 201) containing a miniaturized projector (e.g. 203) translates to a "rocking" tilt movements of a projected image (e.g. 207).

Continuing with FIG. 2, in a preferred embodiment of the invention, the raw unadjusted image A'B'C'D' (207) may be displayed on the projected surface (209) if an automated visual distortion adjustment mode embodied by the invention is turned off or deactivated. If a surface exposing the projector lens of the integrated miniaturized projector (203) were not parallel to a geometrical plane defined by a projected surface (e.g. 209) (i.e. alternatively, if an angle between an imaginary straight line drawn from the center of the projector lens to the projected surface and a point of contact of the imaginary straight line on the projected surface is not perpendicular), then a resulting raw unadjusted image could also have horizontal and/or vertical keystone distortions. A significant keystone distortion would have produced an image which would have been non-rectangular, as shown and described for a trapezoidal figure EFGH in FIG. 4.

Figure 3:
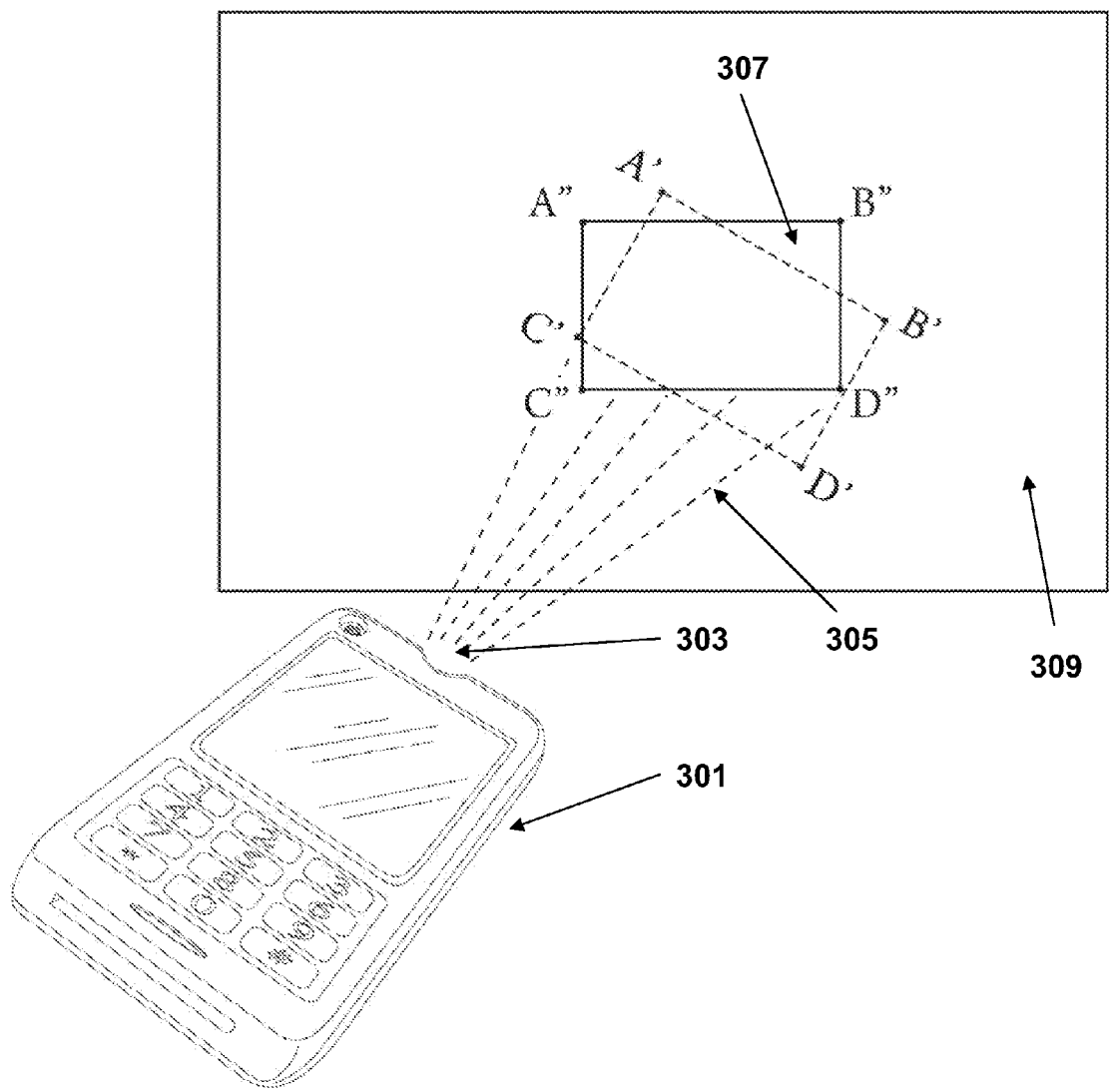
FIG. 3 shows a mobile device tilted clockwise relative to a flat horizontal surface, an adjusted projected image in bold lines (i.e. A",B",C",D"), and what an unadjusted projected image may have looked like in perforated lines (i.e. A',B',C', D'), in accordance with an embodiment of the invention.

FIG. 3 shows a top perspective view (300) of a mobile device tilted (301) clockwise relative to a flat horizontal surface, an adjusted projected image (307) in bold lines (i.e. A"B"C"D"), and what a raw unadjusted image may have looked like in perforated lines (i.e. A'B'C'D'), in accordance with an embodiment of the invention. In general, the mobile device (301) with the integrated miniaturized projector (303) is a type of a portable projection device, which can be portably carried by a user to project an image on a desired surface. In FIG. 3, the integrated miniaturized projector (303) emits projection rays (305) from a projector lens (e.g. 505 of FIG. 5) to form the adjusted projected image A"B"C"D" (307) on a projected surface (309), wherein the adjusted projected image A"B"C"D" (307) is a result of a preemptive or dynamic correction of a clockwise tilt of a raw unadjusted image A'B'C'D' corresponding to a tilted orientation of the mobile device (301). Typically, the projected surface (309) is a vertical wall or a vertical projection screen.

In a preferred embodiment of the invention, the integrated miniaturized projector (303) is operatively connected to or contains an automated visual distortion adjustment apparatus for a portable projection device. In the preferred embodiment of the invention, the automated visual distortion adjustment apparatus comprises a tilt sensor (e.g. 601 of FIG. 6) embedded in the portable projection device, a distance measurement sensor (e.g. 621 of FIG. 6) located near a projector lens, and a lookup table (LUT) unit (e.g. 603 of FIG. 6) operatively connected to the tilt sensor and the distance measurement sensor.

In the preferred embodiment of the invention, one or more sensor output values (i.e. typically as output voltages) from the tilt sensor can identify a current position, a current acceleration, or a current directional orientation of the portable projection device (e.g. the mobile device (301)) relative to a particular geometrical axis. For example, the tilt sensor may be a 3-axis tilt sensor capable of detecting three-dimensional movements to generate output voltages for an x-axis (i.e. a horizontal axis), a y-axis (i.e. a vertical axis), and a z-axis (i.e. a "depth" axis for yaw and additional rotation detection). In case of FIG. 3, the clockwise tilt of the mobile device (301) can be detected by the tilt sensor associated with the automated visual distortion adjustment apparatus.

In a preferred embodiment of the invention, when an automated visual distortion adjustment is used or activated, the raw unadjusted image (i.e. A'B'C'D') is either preemptively or dynamically adjusted by an automated visual distortion adjustment apparatus (e.g. 600 of FIG. 6) to project the adjusted projected image A"B"C"D" (307). In case of a "preemptive" adjustment, the automated visual distortion adjustment apparatus preemptively detects a likely visual distortion, such as an undesirable clockwise tilt of a raw unadjusted image (e.g. A'B'C'D'), before the raw unadjusted image is actually projected through a projector lens by using at least a tilt sensor and a distance measurement sensor. In case of a dynamic adjustment, the automated visual distortion adjustment apparatus may allow projection of a distorted image (e.g. A'B'C'D') for a certain amount of time before automatically correcting the visual distortion to project an adjusted projected image (e.g. A"B"C"D" (307)). The preemptive adjustment and the dynamic adjustment modes may be used separately or jointly, depending on a user's or a manufacturer's preference.

Continuing with FIG. 3, in a preferred embodiment of the invention, the automated visual distortion adjustment apparatus uses the sensor output values as a lookup table key to identify and access one or more particular visual distortion adjustment values stored in a lookup table (LUT) unit. The visual distortion adjustment values can be pre-computed using empirical datasets and stored in the LUT unit, as pre-computation and storage of visual distortion adjustment values are possible by a designer of the automated visual distortion adjustment apparatus as long as the designer can assume anticipated sensor output values or anticipated sensor output value ranges, as shown by "Distance" and "Tilt Sensor Reading" lookup table key examples in FIG. 7. In the preferred embodiment of the invention, the designer can pre-compute and store visual distortion adjustment values in the LUT unit at the time of device manufacturing, based on anticipated position, tilt, or acceleration information from a tilt sensor for a portable projection device (e.g. a mobile device (301)) and an anticipated distance measurement information from a projector lens to a presumed projection surface (e.g. a vertical wall, a vertical projection screen, or any other surface to which a projected image from the projector lens (623) is likely to form) before a user starts using a miniaturized projector (e.g. 303) incorporating the automated visual distortion adjustment apparatus.

The pre-computation of the visual distortion adjustment values minimizes a need for a real-time calculation or a real-time derivation for visual distortion adjustments when sensor output values are presented to a graphics processor, a CPU, or a display driver associated with the automated visual distortion adjustment apparatus. The pre-computation of the visual distortion adjustment values may only incorporate some expected distance and tilt range values. For example, the pre-computation does not have to include corresponding distortion adjustment values for a distance greater than a practical projection range, or a tilt range value beyond correctable assumptions (e.g. a mobile device tilted more than 90 degrees clockwise from 0-degree angle or no-tilt position). Therefore, the pre-computed values stored in an LUT unit are defined within finite ranges. By minimizing the real-time calculation or the real-time derivation for visual distortion adjustments, the present invention minimizes a processor load for the portable projection device (e.g. the mobile device (301)) and processing delays for projection visual distortion corrections. The minimization of the real-time calculation or the real-time derivation for visual distortion adjustments as embodied by the present invention also enable energy efficiency for a prolonged battery use of the portable projection device and fast refresh rates for automated visual distortion adjustment schemes.

Figure 4:
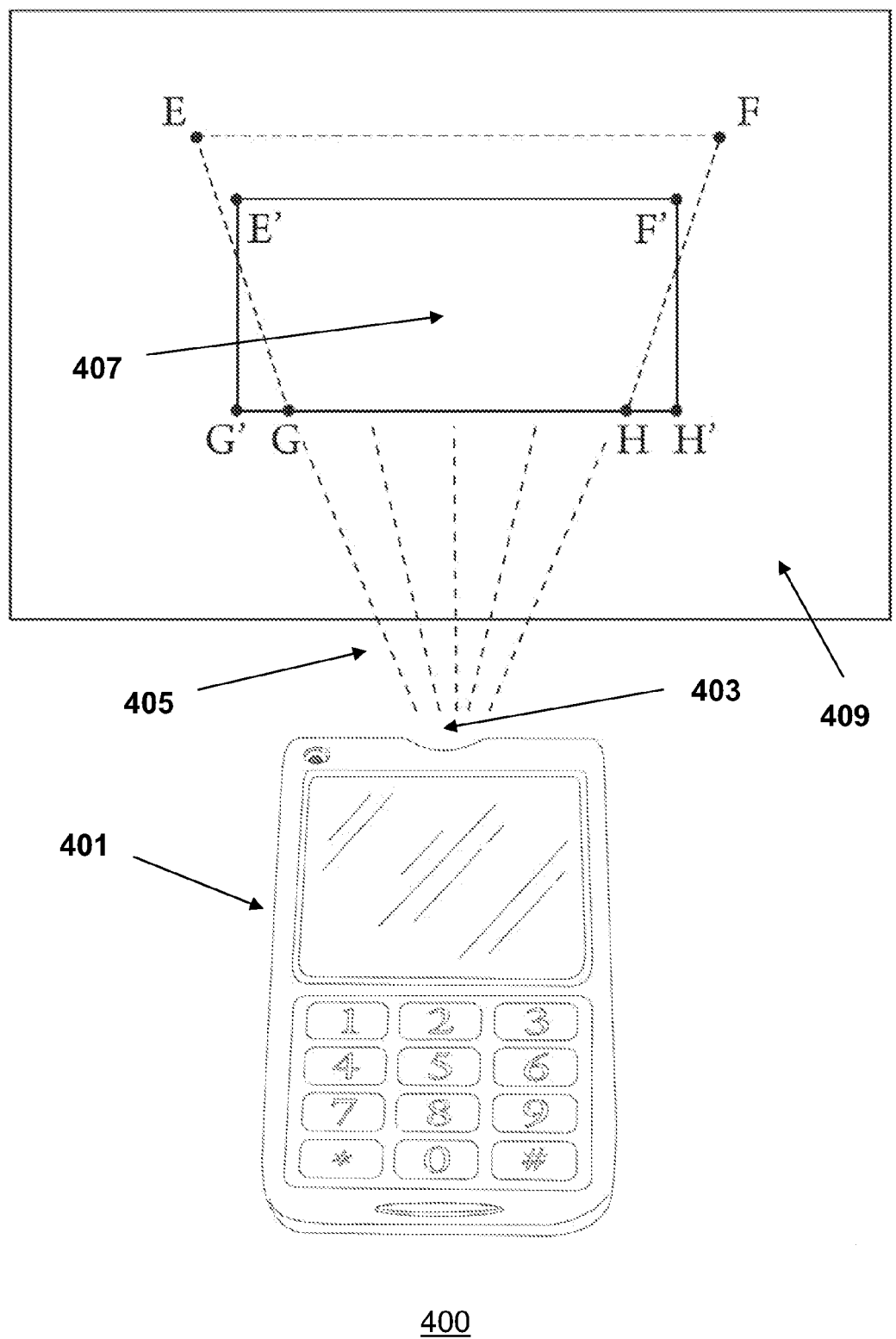
FIG. 4 shows a mobile device tilted upward relative to an ideal angle of a projector lens to a projection screen, with an adjusted projected image in bold lines (i.e. E',F',G'H') and what an unadjusted projected image may have looked like in perforated lines (i.e. E,F,G,H), in accordance with an embodiment of the invention.

FIG. 4 shows a top perspective view (400) of a mobile device (401) tilted upward relative to a flat horizontal plane, an adjusted projected image (407) in bold lines (i.e. E'F'G'H'), and what a raw unadjusted image may have looked like in perforated lines (i.e. EFGH), in accordance with an embodiment of the invention. In general, the mobile device (401) with the integrated miniaturized projector (403) is a type of a portable projection device, which can be portably carried by a user to project an image on a desired surface. In FIG. 4, the integrated miniaturized projector (403) emits projection rays (405) from a projector lens (e.g. 505 of FIG. 5) to form the adjusted projected image E'F'G'H' (407) on a projected surface (409), wherein the adjusted projected image E'F'G'H' (407) is a result of a preemptive or dynamic correction of a vertical keystone distortion of a raw unadjusted image EFGH corresponding to a tilted orientation of the mobile device (401). Typically, the projected surface (409) is a vertical wall or a vertical projection screen.

In a preferred embodiment of the invention, the integrated miniaturized projector (403) is operatively connected to or contains an automated visual distortion adjustment apparatus for a portable projection device. In the preferred embodiment of the invention, the automated visual distortion adjustment apparatus comprises a tilt sensor (e.g. 601 of FIG. 6) embedded in the portable projection device, a distance measurement sensor (e.g. 621 of FIG. 6) located near a projector lens, and a lookup table (LUT) unit (e.g. 603 of FIG. 6) operatively connected to the tilt sensor and the distance measurement sensor. Furthermore, in the preferred embodiment of the invention, one or more sensor output values (i.e. typically as output voltages) from the tilt sensor can identify a current position, a current acceleration, or a current directional orientation of the portable projection device (e.g. the mobile device (401)) relative to a particular geometrical axis. For example, the tilt sensor may be a 3-axis tilt sensor capable of detecting three-dimensional movements to generate output voltages for an x-axis (i.e. a horizontal axis), a y-axis (i.e. a vertical axis), and a z-axis (i.e. a "depth" axis for yaw and additional rotation detection). In case of FIG. 4, the upward tilt of the mobile device (401) relative to a horizontal plane can be detected by the tilt sensor associated with the automated visual distortion adjustment apparatus.

Continuing with FIG. 4, the raw unadjusted image (i.e. EFGH) shows a vertical keystone distortion with a longer upper border (i.e. EF) and a shorter lower border (i.e. GH). Because the mobile device (401) in FIG. 4 is tilted upward relative to the horizontal plane, a vertical depth perception distortion, also known as the vertical keystone distortion, occurs due to an offset between a lower portion and an upper portion of a projector lens to the projected surface (409). The effect of the vertical keystone distortion is narrowing vertical borders (i.e. EG, FH), as illustrated in perforated lines for the raw unadjusted image (i.e. EFGH). It should be noted that a horizontal keystone distortion can also occur if an imaginary line drawn from the center of the projector lens to the projected surface (409) is non-perpendicular. The horizontal keystone distortion would have made the upper border (i.e. EF) and the lower border (i.e. GH) non-parallel.

In a preferred embodiment of the invention, when an automated visual distortion adjustment is used or activated, the raw unadjusted image (i.e. EFGH) is either preemptively or dynamically adjusted by an automated visual distortion adjustment apparatus (e.g. 600 of FIG. 6) to project the adjusted projected image E'F'G'H' (407). In case of a "preemptive" adjustment, the automated visual distortion adjustment apparatus preemptively detects a likely visual distortion, such as an undesirable vertical keystone distortion of a raw unadjusted image (e.g. EFGH), before the raw unadjusted image is actually projected through a projector lens by using at least a tilt sensor and a distance measurement sensor. In case of a dynamic adjustment, the automated visual distortion adjustment apparatus may allow projection of a distorted image (e.g. E'F'G'H') for a certain amount of time before automatically correcting the visual distortion to project an adjusted projected image (e.g. E'F'G'H' (307)). The preemptive adjustment and the dynamic adjustment modes may be used separately or jointly, depending on a user's or a manufacturer's preference.

Continuing with FIG. 4, in a preferred embodiment of the invention, the automated visual distortion adjustment apparatus uses the sensor output values as a lookup table key to identify and access one or more particular visual distortion adjustment values stored in a lookup table (LUT) unit. The visual distortion adjustment values can be pre-computed using empirical datasets and stored in the LUT unit, as pre-computation and storage of visual distortion adjustment values are possible by a designer of the automated visual distortion adjustment apparatus as long as the designer can assume anticipated sensor output values or anticipated sensor output value ranges, as shown by "Distance" and "Tilt Sensor Reading" lookup table key examples in FIG. 7. In the preferred embodiment of the invention, the designer can pre-compute and store visual distortion adjustment values in the LUT unit at the time of device manufacturing, based on anticipated position, tilt, or acceleration information from a tilt sensor for a portable projection device (e.g. a mobile device (401)) and an anticipated distance measurement information from a projector lens to a presumed projection surface (e.g. a projected surface (409) which may be a vertical wall or a vertical projection screen) before a user starts using a miniaturized projector (e.g. 403) incorporating the automated visual distortion adjustment apparatus.

The pre-computation of the visual distortion adjustment values minimizes a need for a real-time calculation or a real-time derivation for visual distortion adjustments when sensor output values are presented to a graphics processor, a CPU, or a display driver associated with the automated visual distortion adjustment apparatus. By minimizing the real-time calculation or the real-time derivation for visual distortion adjustments, the present invention minimizes a processor load for the portable projection device (e.g. the mobile device (401)) and processing delays for projection visual distortion corrections. The minimization of the real-time calculation or the real-time derivation for visual distortion adjustments as embodied by the present invention also enable energy efficiency for a prolonged battery use of the portable projection device and fast refresh rates for automated visual distortion adjustment schemes.

Figure 5:
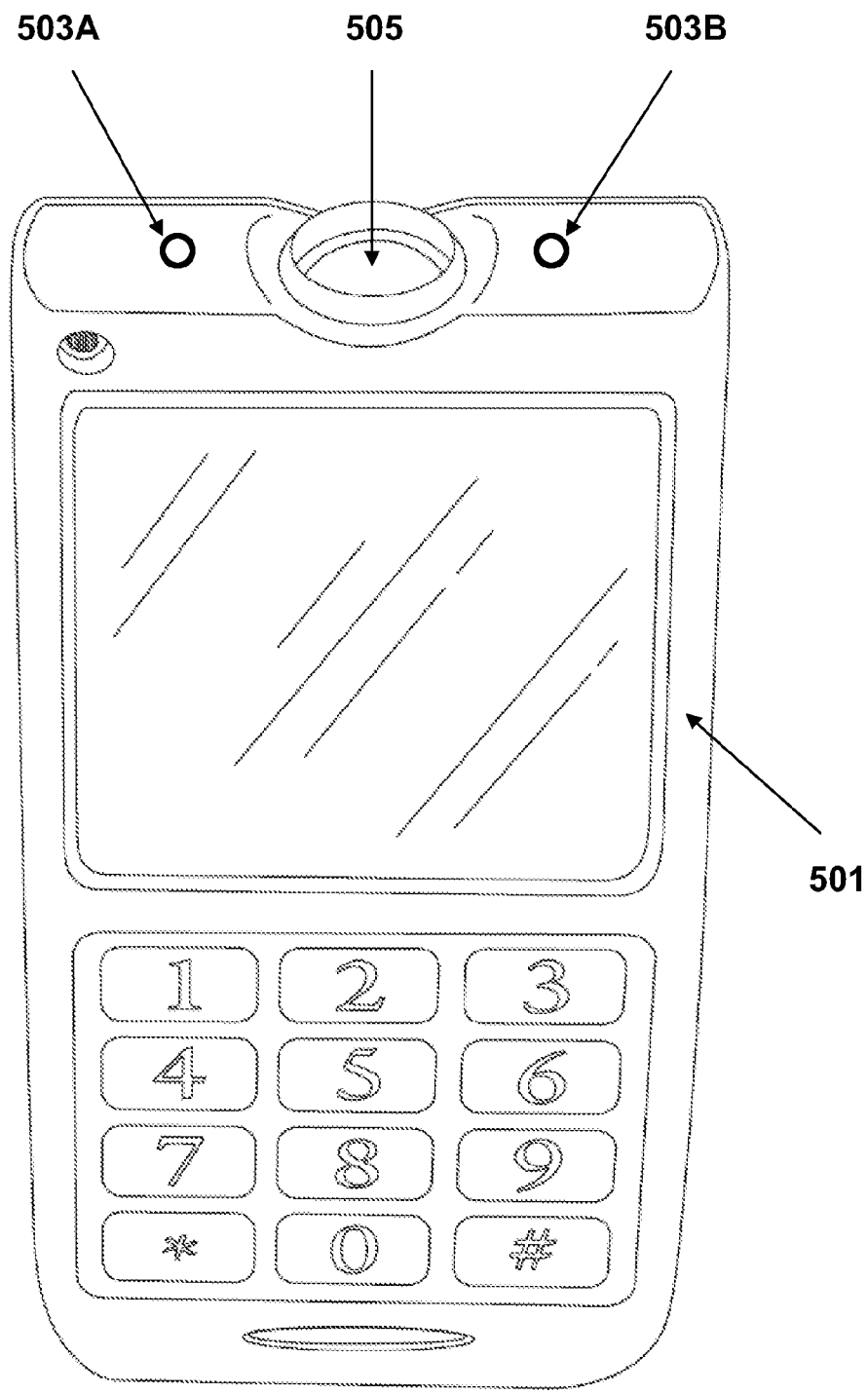
FIG. 5 shows a top perspective view of a mobile device which integrates a miniature projector containing a projector lens and one or more distance sensors near the projector lens, in accordance with an embodiment of the invention.

FIG. 5 shows a top perspective view (500) of a mobile device (501) which integrates a miniature projector containing a projector lens (505) and one or more distance measurement sensors (503A, 503B) near the projector lens (505), in accordance with an embodiment of the invention. In a preferred embodiment of the invention, the one or more distance measurement sensors (503A, 503B) are ultrasonic-based distance measurement sensors which are capable of measuring distance from a surface exposing the projector lens (505) to a presumed projection surface. In another embodiment of the invention, the one or more distance sensors (503A, 503B) are laser-based or radar-based distance measurement sensors also capable of measuring distance from the surface exposing the projector lens (505) to the presumed projection surface.

In a preferred embodiment of the invention, taking one or more distance measurements on the presumed projection surface may be helpful in gathering sufficient distance data to fetch correct keystone adjustment values pre-computed and stored in the LUT for quick access. For example, a first distance measurement sensor may be placed inside, nearby, or behind the projector lens (505) to measure a distance between the projector lens (505) and a near-center point of a projected image on the presumed projection surface. With the distance information between the projector lens (505) and the near-center point of the projected image on the presumed projection surface, the automated visual distortion adjustment apparatus can first estimate the size of the projected image on the presumed projection surface and also estimate the edges of the projected image. In some embodiments of the invention, having this single distance information alone, when combined with output values from a tilt sensor, may be sufficient for accessing pre-computed keystone, tilt, and/or focal adjustment values (i.e. as illustrated by an LUT unit in FIG. 7). This is especially true if horizontal keystone adjustments due to a sideway rotation (i.e. yaw movements) of the projector lens (505) is not a significant factor for a particular portable projection device design.

In other embodiments of the invention, the first distance measurement sensor may incorporate a pivoting mechanism to take more distance information from multiple locations of the projected image (e.g. locations including one or more edges of the projected image). Alternatively, more distance measurement sensors may be used instead of a pivoting distance measurement sensor, to measure more distance information from multiple locations of the projected image other than the near-center point of the projected image. The multiple-location distance measurements may be useful, if a particular portable projection device incorporates a sophisticated automated keystone distortion adjustment scheme, because at least some distance differentials from the projector lens (505) to multiple edges of the projected image can be used to determine the amount of yaw from the projector lens (505) to the presumed projection surface for finer keystone adjustments.

Figure 6:
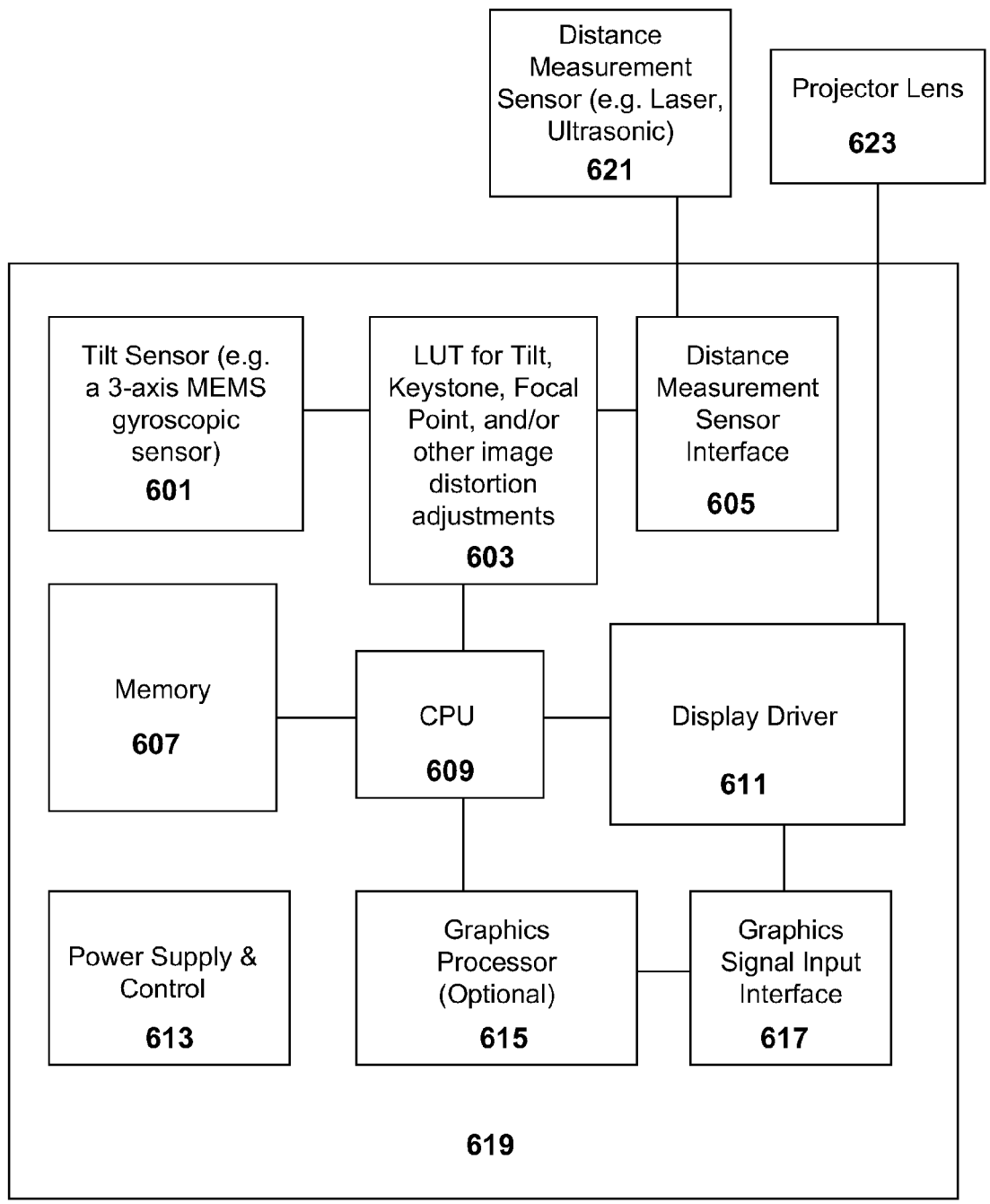
FIG. 6 shows a system block diagram for an apparatus for automated visual distortion adjustments for a portable projection device, in accordance with an embodiment of the invention.

FIG. 6 shows a system block diagram for an automated visual distortion adjustment apparatus (600) for a portable projection device, in accordance with an embodiment of the invention. In a preferred embodiment of the invention, the automated visual distortion adjustment apparatus (600) has a tilt sensor (601) embedded in a portable projection device casing (619). The tilt sensor (601) is generally capable of determining a current position, a current acceleration, or a current directional orientation of the portable projection device relative to a horizontal plane or a vertical plane. Examples of the tilt sensor include, but are not limited to, a gyroscopic sensor, an accelerometer, a position sensor, and an optical leveling sensor. Tilt sensors may be MEMS (micro electro-mechanical systems) devices, mechanical devices, and/or electronic devices. In the preferred embodiment of the invention, a tilt sensor can generate an output value, typically as an output voltage, to indicate a current position, acceleration, or a directional orientation of the portable projection device. Furthermore, one tilt sensor may provide multiple-axis output values. For example, a 3-axis MEMS gyroscopic sensor or a 3-axis MEMS accelerometer is able to provide three output voltage values (e.g. output voltage readings for x-axis, y-axis, and z-axis), which can be used to identify directional acceleration, tilts, positions, and yaw.

Furthermore, the automated visual distortion adjustment apparatus (600) also includes a distance measurement sensor (621) located near a projector lens (623) of the portable projection device. In a preferred embodiment of the invention, the distance measurement sensor (621) is an ultrasonic-based distance measurement sensor, which is capable of emitting ultrasonic waves to a presumed projection surface and receiving a fraction of the emitted wave reflected from the presumed projection surface to calculate the distance between the presumed projection surface and the projector lens (623). In another embodiment of the invention, the distance measurement sensor (621) is a laser-based sensor which can detect a phase shift of emitted lasers from the laser-based sensor when it is reflected from the presumed projection surface. Yet in another embodiment of the invention, the distance measurement sensor (621) is a radar-based sensor which emits a radio-frequency (RF) wave to the presumed projection surface and detects a reflected RF wave to calculate the distance between the presumed projection surface and the projector lens (623).

In a preferred embodiment of the invention, the distance measurement sensor (621) is operatively connected to a lookup table (LUT) unit (603) and supplies an output value to the LUT unit (603). The distance measurement sensor (621) may also be connected to a distance measurement sensor interface (605) which acts as an intermediary interface to send the output value of the distance measurement sensor (621) the LUT unit (603). In one embodiment of the invention, the distance measurement sensor interface (605) also incorporates logic blocks to process, analyze, and/or control inputs to and outputs from the distance measurement sensor (621).

Continuing with FIG. 6, in a preferred embodiment of the invention, the LUT unit (603) contains tilt, keystone, focal point, and/or other visual distortion adjustment values, which are pre-computed and stored at the time of manufacturing the automated visual distortion adjustment apparatus (600) for quick access based on a particular value or a particular set of values as lookup table keys. In the preferred embodiment of the invention, the particular set of values as lookup table keys comprises sensor output values from the tilt sensor (601) and the distance measurement sensor (621). In one embodiment of the invention, the lookup table keys may take a range of values (e.g. 0.5 m~1.0 m as a range of "distance", 1.05~1.07 V as a range of tilt-position "Xout" values as an LUT key) from the sensor output values to identify a particular set of stored LUT values (e.g. tilt adjust value, keystone adjust value, and etc.). In another embodiment of the invention, the lookup table keys may take a specific numerical value, typically rounded up or down to a sensor-detectable sensitivity level from the sensor output values (e.g. 0.5 m as a specific distance value and 1.05 V as a specific tilt-position "Xout" value as an LUT key) instead of a broader range of values (e.g. 0.5 m~1.0 m, 1.05~1.07V, and etc.).

The LUT unit (603) of FIG. 6 typically stores a plurality of visual distortion adjustment values which are pre-computed using empirical datasets (e.g. calculating and storing necessary visual distortion adjustment values based on expected sensor output values or ranges of values from the tilt sensor (601) and the distance measurement sensor (621) at the time of designing or manufacturing the automated visual distortion adjustment apparatus (600)). This pre-computation and storage of visual distortion adjustment values are possible by a designer of the automated visual distortion adjustment apparatus (600) as long as the designer has sufficient assumptions (e.g. expected sensor output values or anticipated sensor output value ranges, as shown by "Distance" and "Tilt Sensor Reading" lookup table key examples in FIG. 7) to derive visual distortion adjustment values (e.g. values to be stored in the LUT unit (603)).

The types of pre-computed and stored visual distortion adjustment values in the LUT unit (603) depend on specific embodiments of the invention. For example, in one embodiment of the invention, the pre-computed and stored visual distortion adjustment scheme may simply incorporate sideways tilt adjustment values, which corrects any clockwise or counterclockwise turn of a projected image when a portable projection device, such as a mobile device incorporating an integrated miniaturized projector, is turned clockwise or counterclockwise in a user's hand relative to a level position (e.g. a plane parallel to a horizontal plane). An example of a sideways tilt adjustment is illustrated by FIG. 3. In another embodiment of the invention, the pre-computed and stored visual distortion adjustment scheme may also incorporate keystone adjustment values (e.g. horizontal keystone, vertical keystone, or both), which correct a projected image distortion due to a forward tilt or a backward tilt of the portable projection device, as illustrated by an example in FIG. 4. Yet in another embodiment of the invention, the pre-computed and stored visual distortion adjustment scheme may also incorporate focal adjustment values for automated focusing of the projector lens (623).

Continuing with FIG. 6, the pre-computation of the visual distortion adjustment values which are stored at the time of designing or manufacturing the LUT unit (603) of the automated visual distortion adjustment apparatus (600) minimizes a need for a real-time calculation or a real-time derivation for visual distortion adjustments, when sensor output values are presented to a graphics processor (615), a CPU (609), or a display driver (611) associated with the automated visual distortion adjustment apparatus. By minimizing the real-time calculation or the real-time derivation for visual distortion adjustments, the present invention minimizes a processor load for the portable projection device (e.g. the mobile device (401)) and processing delays for projection visual distortion corrections or adjustments. The minimization of the real-time calculation or the real-time derivation for visual distortion adjustments as embodied by the present invention also enable energy efficiency for a prolonged battery use of the portable projection device and fast refresh rates for automated visual distortion adjustment schemes.

In a preferred embodiment of the invention, the LUT unit (603) is operatively connected to the CPU (609), the tilt sensor (601), the distance measurement sensor (621), and the graphics processor (615). The CPU (609) may be capable of instructing the LUT unit (603) to retrieve one or more pre-computed visual distortion adjustment values stored in the LUT unit (603). Alternatively, the graphics processor (615), if present, may be capable of instructing the LUT unit (603) to retrieve the one or more pre-computed visual distortion adjustment values stored in the LUT unit (603). Once the one or more pre-computed visual distortion adjustment values are retrieved from the LUT unit (603) using the sensor output values as a lookup table key, then the CPU (609), the graphics processor (615), and/or the display driver (611) may use the one or more pre-computed visual distortion adjustment values to synthesize an adjusted projection image for an undesirable sideways (i.e. clockwise or counterclockwise) tilt, a keystone distortion, and/or a focal distortion of a raw unadjusted image. As explained for FIGS. 3~4, the automated visual distortion adjustment apparatus (600) can preemptively or dynamically adjust the raw unadjusted image depending on a manufacturer's or a user's preference.

Continuing with FIG. 6, in the preferred embodiment of the invention, the display driver (611) is operatively connected to a display source associated with the projector lens (623). The display driver (611) is also operatively connected to the CPU (609), the graphics processor (615), and/or a graphics signal input interface (617). In one embodiment of the invention, the display driver (611) is able to supply appropriate data signals and source voltages to a projection display source such as a display panel or another display medium, which emits a projection image through the projector lens for a magnified projection image on a projected surface, such as a vertical wall or a vertical projection screen. The display driver (611) and/or the graphics processor (615) may also be operatively connected to the graphics signal input interface (617), wherein the graphics signal input interface (617) is configured to receive graphics signals from a graphics input port to relay the graphics signals to the graphics processor (615), the CPU (609), and/or the display driver (611). In the preferred embodiment of the invention, the graphics processor (615) contains or is operatively connected to a specialized graphics memory bank to process, render, buffer, and/or synthesize graphic data. Furthermore, a general memory unit (607) may be operatively connected to the CPU (609) and/or another logic block (e.g. the graphics processor (615), the graphics signal input interface (617), the display driver (611), the LUT unit (603)) for use of an available memory space inside the general memory unit. In addition, a power supply & control unit (613) may be operatively connected to the CPU (609), another logic block, and/or a sensor unit (e.g. 601, 621) associated with the portable projection device casing (619) to supply regulated electrical power to these logic blocks.

FIG. 7 shows an example of a lookup table (LUT) unit (700) for auto sideways tilt-leveling, keystone-balancing, and optional auto focal adjustments in accordance with an embodiment of the invention. In a preferred embodiment of the invention, the top row, "Distance (m)", serves as a first sensor output value, or a first sensor output value range which are read from a distance measurement sensor. In addition, the leftmost column, "Tilt Sensor Reading (V)", serves as a set of second sensor output value, or a set of second sensor output value range which are read from a tilt sensor. In one embodiment of the invention, the set of second sensor output value or the set of second sensor output value range comprises three-axis voltage outputs for an x-axis (i.e. Xout), a y-axis (i.e. Yout), and a z-axis (i.e. Zout). The set of second sensor output value or the set of second sensor output value range can be output voltage values from a three-axis tilt sensor, which can measure horizontal, vertical, and yaw positions or accelerations of a portable projection device embedding the three-axis tilt sensor.

In a preferred embodiment of the invention, visual distortion adjustment values are pre-computed and stored into a non-volatile memory or another storage medium associated with the LUT unit (700). Examples of pre-computed and stored visual distortion adjustment values include, but are not limited to, a sideways tilt adjustment value, a keystone adjustment value, and a focal adjustment value. In one embodiment of the invention, the keystone adjustment value may be divided into a horizontal keystone adjustment value and a vertical keystone adjustment value. When these visual distortion adjustment values are presented to an image processing algorithm or an image processing program executed on a CPU or a graphics processor, an adjusted projection image can be synthesized to correct an undesirable visual distortion in a raw unadjusted image. An adjustment or a correction of the undesirable visual distortion may provide an effect of a sideways tilt-leveling (e.g. correcting a clockwise or a counter clockwise orientation of a raw unadjusted image as shown in FIG. 3), a touchstone-balancing (e.g. correcting a vertical keystone distortion of a raw adjusted image as shown in FIG. 4), and/or a focal adjustment of a projector lens to a presumed projection surface.

Figure 8:
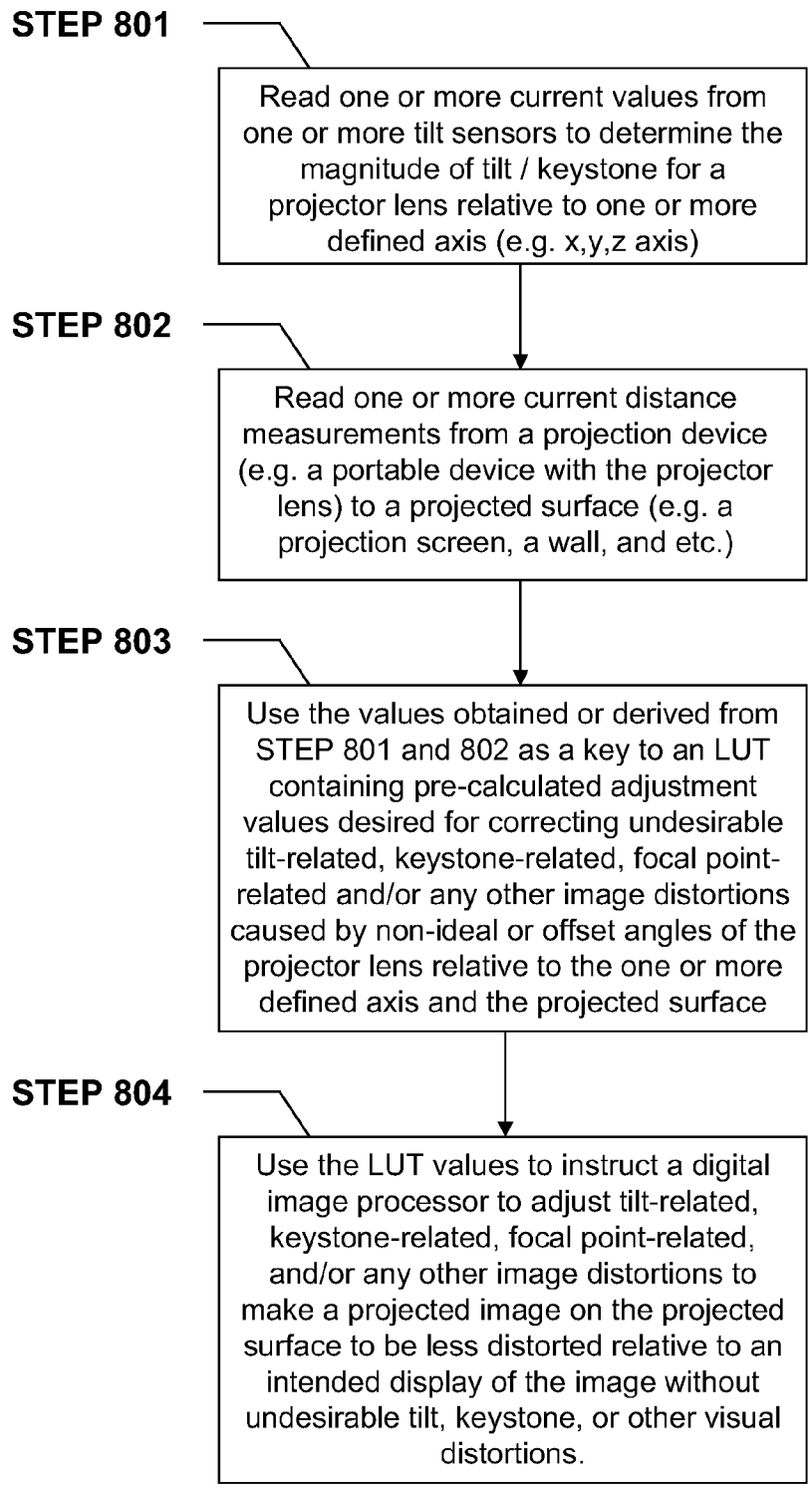
FIG. 8 shows a method for automated visual distortion adjustments for a portable projection device, in accordance with an embodiment of the invention.

FIG. 8 shows a method flowchart (800) for automated visual distortion adjustments for a portable projection device, in accordance with an embodiment of the invention. In STEP 801, an automated visual distortion adjustment apparatus embedded in or associated with a portable projection device reads one or more current output values from a tilt sensor to determine a magnitude of tilt, keystone distortion, and/or other factors for a potential visual distortion for a projector lens relative to one or more geometrical axis which define a horizontal plane or a vertical plane. Then, in STEP 802, the automated visual distortion adjustment apparatus reads a distance sensor for a distance measurement between a surface near the projection lens and a projected surface, wherein the projected surface is on the vertical plane typically represented by a projection screen or a wall. Then, in STEP 803, a lookup table (LUT) unit operatively connected to the tilt sensor and the distance sensor uses the one or more current values from the tilt sensor and the distance measurement as a lookup table key to retrieve a corresponding pre-computed visual distortion adjustment value from the LUT unit. In a preferred embodiment of the invention, the pre-computed visual distortion adjustment value contains information to correct an undesirable tilt (i.e. typically a sideways clockwise tilt or a sideways counterclockwise tilt), a keystone distortion (i.e. either a horizontal keystone distortion or a vertical keystone distortion), and/or other visual distortions caused by a non-ideal angle or an offset angle of the projector lens relative to the projected surface. Then, in STEP 804, the automated visual distortion adjustment apparatus can instruct a graphics processor or a CPU of the portable projection device to correct the undesirable tilt, the keystone distortion, or other visual distortions by adjusting a raw projection image with the pre-computed visual distortion adjustment value to produce a corrected projection image.

The present invention in various embodiments as described for FIGS. 3~8 provide several advantages. First, the pre-computation of the visual distortion adjustment values by a device designer based on anticipated tilt and distance measurement sensor output values minimizes a need for a real-time calculation or a real-time derivation for visual distortion adjustments when the sensor output values are presented to a graphics processor, a CPU, or a display driver associated with the automated visual distortion adjustment apparatus. By minimizing the real-time calculation or the real-time derivation of visual distortion adjustments, the present invention can minimize a processor load for the portable projection device and also minimize processing delays for projection of a corrected or adjusted image. Furthermore, the fast retrieval of the pre-computed visual distortion adjustment values, which replaces or reduces a need for conventional methods of real-time calculation for visual distortion adjustments, also achieve energy efficiency for a prolonged battery use of the portable projection device by using less CPU or graphic processing power. In addition, the LUT-based retrieval of the pre-computed visual distortion adjustment values and the minimization of processor usage enable significantly faster refresh rates for automated visual distortion adjustments, compared to conventional visual distortion adjustment methods which calculate visual distortion adjustment values in real-time. The faster refresh rates are especially useful for a portable projection device placed on a non-stationary surface such as a user's hand, which may tilt, vacillate, or move abruptly and frequently because the faster refresh rates enable rapid preemptive visual distortion adjustments to make an adjusted projection image more level, stable, and balanced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for automated visual distortion adjustments for a portable projection device, the apparatus comprising:
    a three-dimensional tilt sensor embedded in the portable projection device, wherein the three-dimensional tilt sensor is designed to determine a current horizontal (x-axis) position, a current vertical (y-axis) position, a current depth (z-axis) position, and a current clockwise or counterclockwise rotational orientation of the portable projection device relative to a horizontal plane or a vertical plane;
    a distance measurement sensor next to a projector lens embedded in the portable projection device, wherein the distance measurement sensor is designed to determine a current distance reading between a surface of the portable projection device and a presumed projection surface;
    a lookup table (LUT) unit operatively connected to the three-dimensional tilt sensor and the distance measurement sensor, wherein the LUT unit takes the current horizontal (x-axis) position, the current vertical (y-axis) position, and the current depth (z-axis) position sensor output values from the three-dimensional tilt sensor and the current distance reading from the distance measurement sensor as a combined lookup table key to retrieve a yaw distortion correction value and a rotational orientation correction value from the LUT unit for an automated three-dimensional (x-axis, y-axis, and z-axis) correction for adjustment or prevention of both yaw and rotational orientation-related projection distortion from the portable projection device; and
    a graphics processor and/or a central processing unit (CPU) in the portable projection device to produce, process, and/or control a corrected projection image based on the yaw distortion correction value and/or the rotational orientation correction value retrieved from the LUT unit.

2. The apparatus of claim 1, wherein the combined lookup table key comprising the current horizontal (x-axis) position, the current vertical (y-axis) position, and the current depth (z-axis) position sensor output values from the three-dimensional tilt sensor and the current distance reading from the distance measurement sensor also retrieves a vertical keystone adjustment value and a focal adjustment value from the LUT unit.

3. The apparatus of claim 2, wherein the graphics processor and/or the CPU are capable of producing, processing, and/or controlling the corrected projection image in three dimensions (x-axis, y-axis, and z-axis) based on the yaw distortion correction value, the rotational orientation correction value, the vertical keystone adjustment value, and/or the focal adjustment value retrieved from the LUT unit.

4. The apparatus of claim 3, further comprising a display driver configured to produce, process, and/or control the corrected projection image transmitted to the projector lens for image projection.

5. The apparatus of claim 3, further comprising a graphics signal input interface which is designed to receive an external graphics signal source or an internal graphics signal source which can be transmitted to the graphics processor or the CPU.

6. The apparatus of claim 3, wherein the corrected projection image is a tilt-leveled and/or keystone-balanced adjustment of a raw projection image, which may have appeared tilted clockwise, counterclockwise, or visually skewed if the tilt-leveled and/or keystone-balanced adjustment were not performed.

7. The apparatus of claim 1, wherein the combined lookup table key comprises at least one voltage reading as an output from the three-dimensional tilt sensor and at least one distance measurement reading as an output from the distance sensor.

8. The apparatus of claim 1, further comprising a distance measurement sensor interface operatively connected to the distance measurement sensor, wherein the distance measurement sensor interface is designed to communicate with the distance measurement sensor and a central processing unit (CPU) (i.e. a microprocessor or a microcontroller) of the portable projection device.

9. The apparatus of claim 1, wherein the three-dimensional tilt sensor and the distance measurement sensor are periodically polled by the central processing unit (CPU) of the portable projection device to obtain current sensor output values which are used as the combined lookup table key to retrieve the yaw distortion correction value, the rotational orientation correction value, the vertical keystone adjustment value, and/or the focal adjustment value stored in the LUT unit.

10. The apparatus of claim 1, wherein the portable projection device is a mobile device which integrates a miniaturized projector.

11. The apparatus of claim 1, wherein the LUT unit is implemented on a non-volatile memory unit, a programmable semiconductor chip, and/or a software module stored in a data storage medium.

12. A method for automatically adjusting a visual distortion from a portable projection device, the method comprising the steps of:
    reading sensor output values from a three-dimensional tilt sensor to determine a current horizontal (x-axis) position, a current vertical (y-axis) position, a current depth (z-axis) position, and a current clockwise or counterclockwise rotational orientation for a visual distortion correction;
    reading a distance sensor for a distance measurement reading between a surface of the portable projection device and a projected surface, wherein the projected surface is on a vertical plane typically represented by a projection screen or a wall;

using the sensor output values from the three-dimensional tilt sensor and the distance measurement reading from the distance sensor as a combined lookup table (LUT) key to retrieve a yaw distortion correction value and a rotational orientation correction value stored in a lookup table (LUT) unit for an automated three-dimensional (x-axis, y-axis, and z-axis) correction for adjustment or prevention of both yaw and rotational orientation-related projection distortion from the portable projection device; and instructing a graphics processor or a central processing unit (CPU) of the portable projection device to produce, process, and/or control a corrected projection image based on the yaw distortion correction value, the rotational orientation correction value, the vertical keystone adjustment value, and/or the focal adjustment value retrieved from the LUT unit.

13. The method of claim 12, further comprising a step of using a display driver operatively connected to the graphics processor or the CPU to formulate and/or transmit the corrected projection image to the projector lens, wherein the corrected projection image is a result of adjusting a raw projection image in three dimensions (x-axis, y-axis, and z-axis) with the yaw distortion correction value, the rotational orientation correction value, the vertical keystone adjustment value, and/or the focal adjustment value retrieved from the LUT unit.

14. The method of claim 12, wherein the lookup table (LUT) key comprises at least one voltage reading as an output from the three-dimensional tilt sensor and at least one distance measurement reading as an output from the distance sensor.

15. The method of claim 13, wherein the corrected projection image is a tilt-leveled and/or keystone-balanced adjustment of the raw projection image, which may have appeared tilted clockwise, counterclockwise, or visually skewed if the tilt-leveled and/or keystone-balanced adjustment of the raw projection image were not performed.

16. An apparatus for automated visual distortion adjustments for a mobile device integrating a miniaturized projector, the apparatus comprising:

a three-dimensional tilt sensor embedded in the mobile device integrating the miniaturized projector, wherein the three-dimensional tilt sensor is designed to determine a current horizontal (x-axis) position, a current vertical (y-axis) position, a current depth axis (z-axis) position, and a current clockwise or counterclockwise rotational orientation of the mobile device relative to a horizontal plane or a vertical plane;

a distance measurement sensor next to a projector lens of the miniaturized projector embedded in the mobile device, wherein the distance measurement sensor is designed to determine a current distance reading between a surface of the mobile device and a presumed projection surface;

a lookup table (LUT) unit operatively connected to the three-dimensional tilt sensor and the distance measurement sensor, wherein the LUT unit takes the current horizontal (x-axis) position, the current vertical (y-axis) position, and the current depth axis (z-axis) position sensor output values from the three-dimensional tilt sensor and the current distance reading from the distance measurement sensor as a combined lookup table key to retrieve a yaw distortion correction value and a rotational orientation correction value from the LUT unit for an automated three-dimensional (x-axis, y-axis, and z-axis) correction for adjustment or prevention of both yaw and rotational orientation-related projection distortion from the mobile device integrating the miniaturized projector; and a graphics processor and/or a central processing unit (CPU) in the mobile device integrating the miniaturized projector to produce, process, and/or control a corrected projection image based on the yaw distortion correction value and/or the rotational orientation correction value retrieved from the LUT unit.

17. The apparatus of claim 16, wherein the combined lookup table key comprising the current horizontal (x-axis) position, the current vertical (y-axis) position, and the current depth (z-axis) position sensor output values from the three-dimensional tilt sensor and the current distance reading from the distance measurement sensor also retrieves a vertical keystone adjustment value and a focal adjustment value from the LUT unit.

18. The apparatus of claim 16, wherein the graphics processor and/or the CPU are capable of producing, processing, and/or controlling the corrected projection image in three dimensions (x-axis, y-axis, and z-axis) based on the yaw distortion correction value, the rotational orientation correction value, the vertical keystone adjustment value, and/or the focal adjustment value retrieved from the LUT unit.

19. The apparatus of claim 18, wherein the corrected projection image is a tilt-leveled and/or keystone-balanced adjustment of a raw projection image, which may have appeared tilted clockwise, counterclockwise, or visually skewed if the tilt-leveled and/or keystone-balanced adjustment were not performed.

* * * * *